INVENTOR
JACK G. LITTLE
BY Donald F. Voss
ATTORNEY

Sept. 5, 1967 J. G. LITTLE 3,340,515

DATA BUFFERING FOR TIME RELATED MEASURED DATA TRANSMITTED ASYNCHRONOUSLY

Filed Nov. 17, 1964 11 Sheets-Sheet 3

United States Patent Office 3,340,515

Patented Sept. 5, 1967

3,340,515

DATA BUFFERING FOR TIME RELATED MEASURED DATA TRANSMITTED ASYNCHRONOUSLY

Jack G. Little, Rochester, Minn., assignor to International Business Machines Corporation, New York, N.Y., a corporation of New York

Filed Nov. 17, 1964, Ser. No. 411,867
9 Claims. (Cl. 340—172.5)

ABSTRACT OF THE DISCLOSURE

Conversion of measured physiological variables takes place sequentially under control of an address ring. The address ring controls scanning switches for connecting data sources to a conversion unit. Three different kinds of conversions can take place. One type is an analog to digital conversion for level type variables, such as temperture, pressure, etc. Another type is a rate conversion, such as pulse and respiration rates. Still another conversion is a level conversion at predetermined periods of time, such as blood pressure measurements.

At the end of a conversion, data transfer controls are rendered operable. The data transfer controls are also operably controlled by data conversion identification controls according to the type of measurement and conversion made. If the conversion is a rate or level conversion, one mode of operation is initiated. If the conversion is for a level at a predetermined time, another mode of operations takes place.

Under the first mode of operation, data from the conversion unit is transferred to a buffer storage register and transmit controls effect a transmission request. Upon the transmission request being honored, selection switches are operated and a strobe ring is started. Data characters in the buffer are then sequentially transmitted under control of the strobe ring. The strobe ring also provides a pulse for opening the selection switches at the end of transmission of data.

If the next variable measured and converted were a level occurring at a predetermined period of time, the data transfer controls do not activate the transmit controls; however, the data in the conversion unit is transferred to the buffer. Further, the data transfer controls start the strobe ring directly. No data will be transmitted as the strobe ring advances through its positions because the selection switches will not be closed due to the fact no selection request was made. After the strobe ring runs through its positions, the conversion unit is reset. Then after the next measurement is converted, data in the conversion unit is not transferred to the buffer because the buffer still contains data from the previous conversion. The transmit controls are rendered operable whereby a transmission request is made. The selection switches are closed and the strobe ring is started whereby data from the buffer is transmitted. After the strobe ring runs through its positions, the normal conversion reset is inhibited by the condition of the data transfer controls. Then, after a short delay, the data transfer controls are operated whereby data transfers from the conversion unit to the now empty buffer. Also, the transmit controls are operated by the data transfer controls, whereby a transmission request is made. The selection switches are then closed and the strobe ring is again operated and data is transmitted from the buffer.

This invention relates to data transfer control apparatus and more particularly to such apparatus for controlling the transfer of measured data including the transfer of sequentially measured time related data.

Data acquisition devices are capable of monitoring measured data such as temperature, pressure, rates, signal frequency, etc. Further, there is a need to transmit the measured data over communication lines to enable processing at a remote location. Processors are generally capable of receiving data from many monitoring devices. Consequently, the monitoring devices must wait their turns to be polled by the processor. The monitoring devices indicate when they are ready to transmit data and then upon being polled, the data is transmitted.

With monitors sequentially scanning different measured variables, it would normally be just a matter of making a measurement, providing a ready-to-transmit signal and waiting until the transmission line became available as a result of being polled. However, some measured variables are time related, such as systolic and diastolic blood pressure. Once one type of blood pressure measurement is made, the other sequentially follows on the same pressure cycle. Therefore, since the time required to be polled is indeterminate, a special buffering arrangement is required whereby both time independent and time related measured variables can be transmitted without loss of data. Further, to prevent electrical noise from interfering with the reading, scanning or the making of a measurement of time related variables, controls are provided whereby a transmission request is not made for the first measurement until the subsequent time related measurement in process has been completed.

Accordingly, a basic object of the invention is to provide data buffering and control apparatus for facilitating transmission of both time independent and time related measured variables.

Another very important object of the invention is to provide data transfer control apparatus for time related measured variables which makes a transmission request for a first measured variable only after the measurement of the second time related variable has been completed whereby electrical noise attendant with a transmission request will not interfere with the measurement of the second variable.

The foregoing and other objects, features and advantages of the invention will be apparent from the following more particular description of a preferred embodiment of the invention, as illustrated in the accompanying drawings.

In the drawings:

FIG. 1 is a block diagram of data acquisition and transferring system incorporating the invention;

FIGS. 2*a*, 2*b*, 2*c*, 2*d*, 2*e*, 2*f* and 2*g* taken together as shown in FIG. 3 represent a detailed schematic diagram of the system of FIG. 1;

Figure 5A:
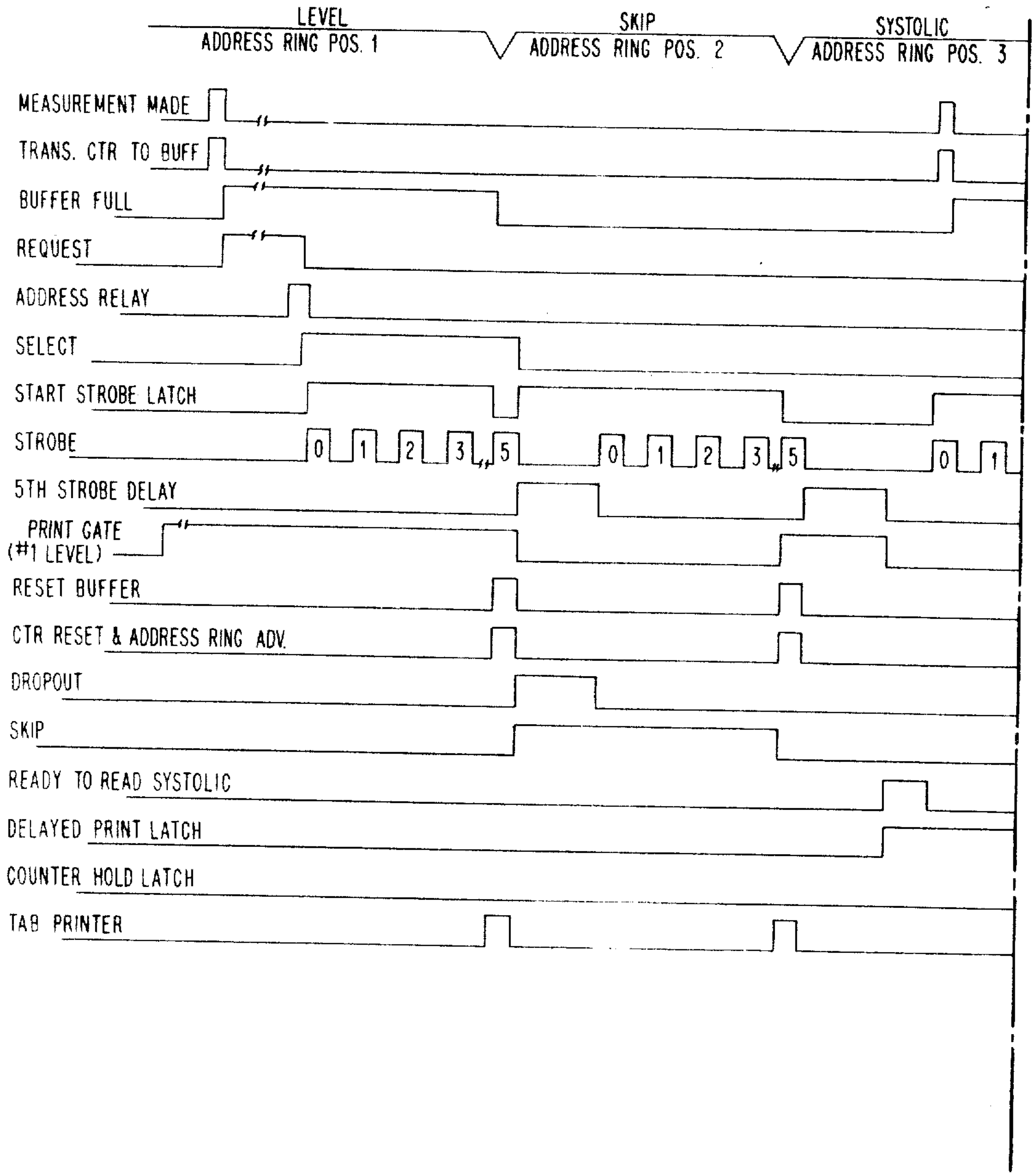
Figure 5B:
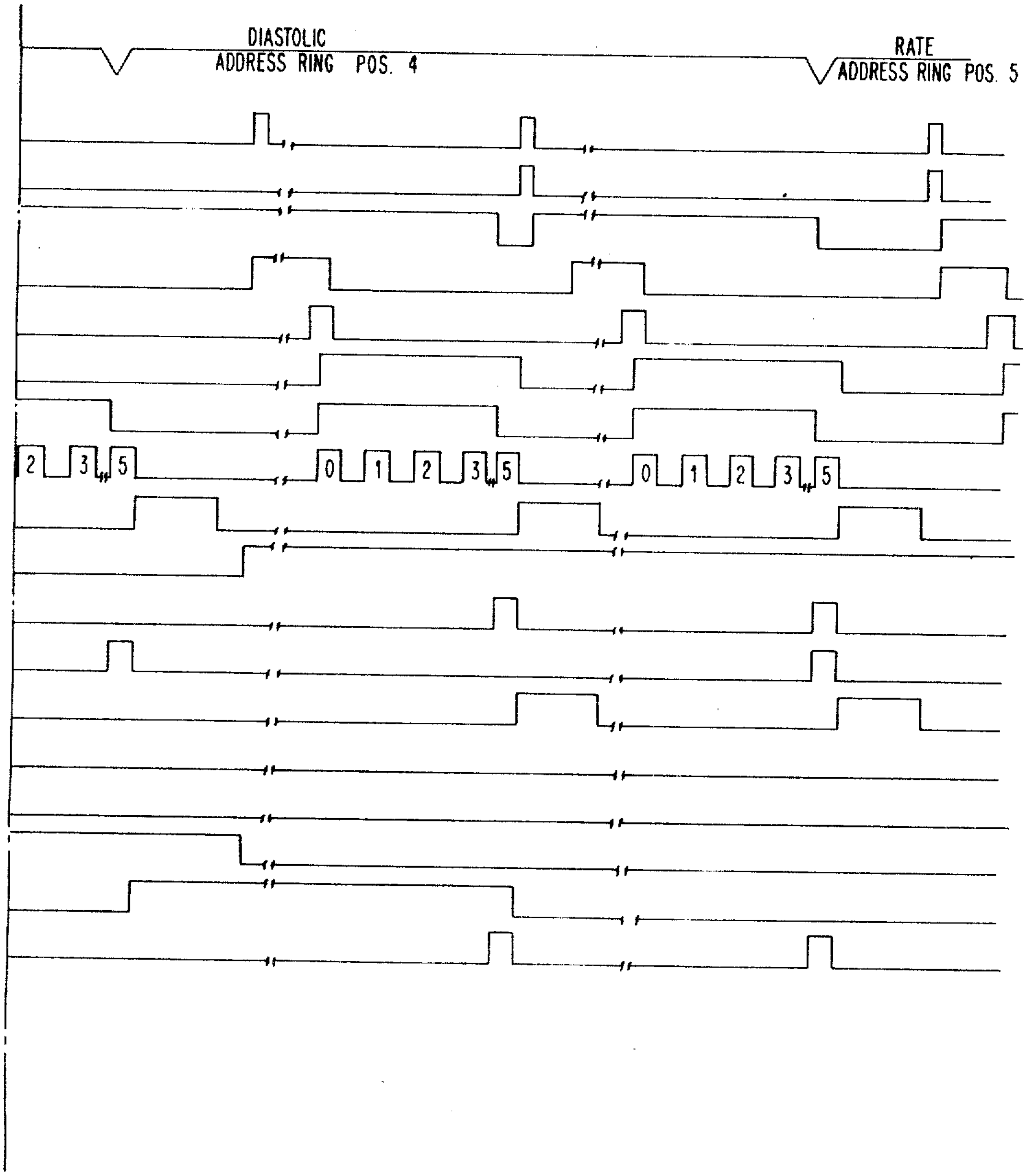

FIGS. 5*a* and 5*b* taken together, with FIG. 5*a* disposed to the left of FIG. 5*b*, form a timing diagram for the system.

*General*

Figure 1:
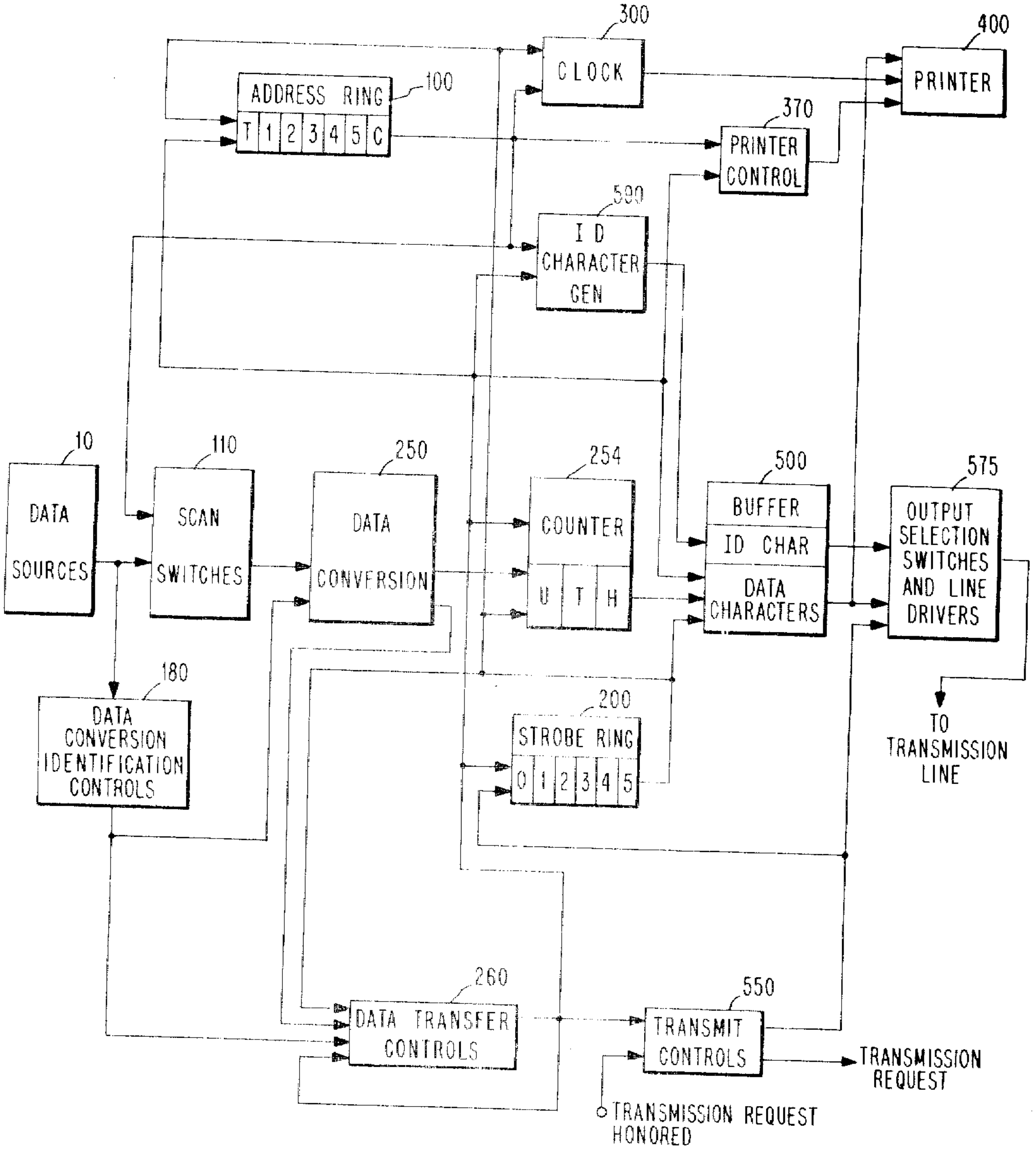
Figure 2A:
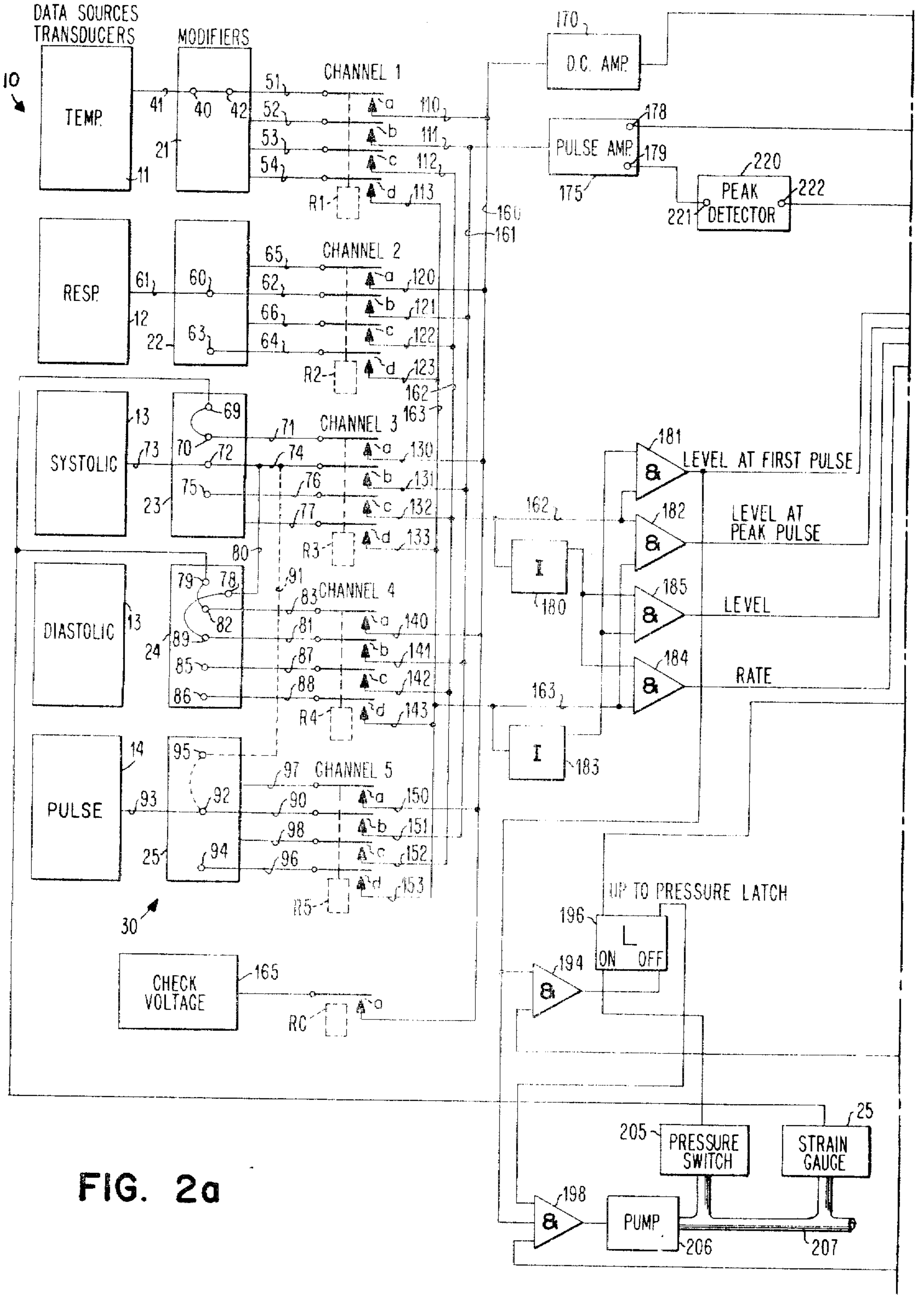
Figure 2B:
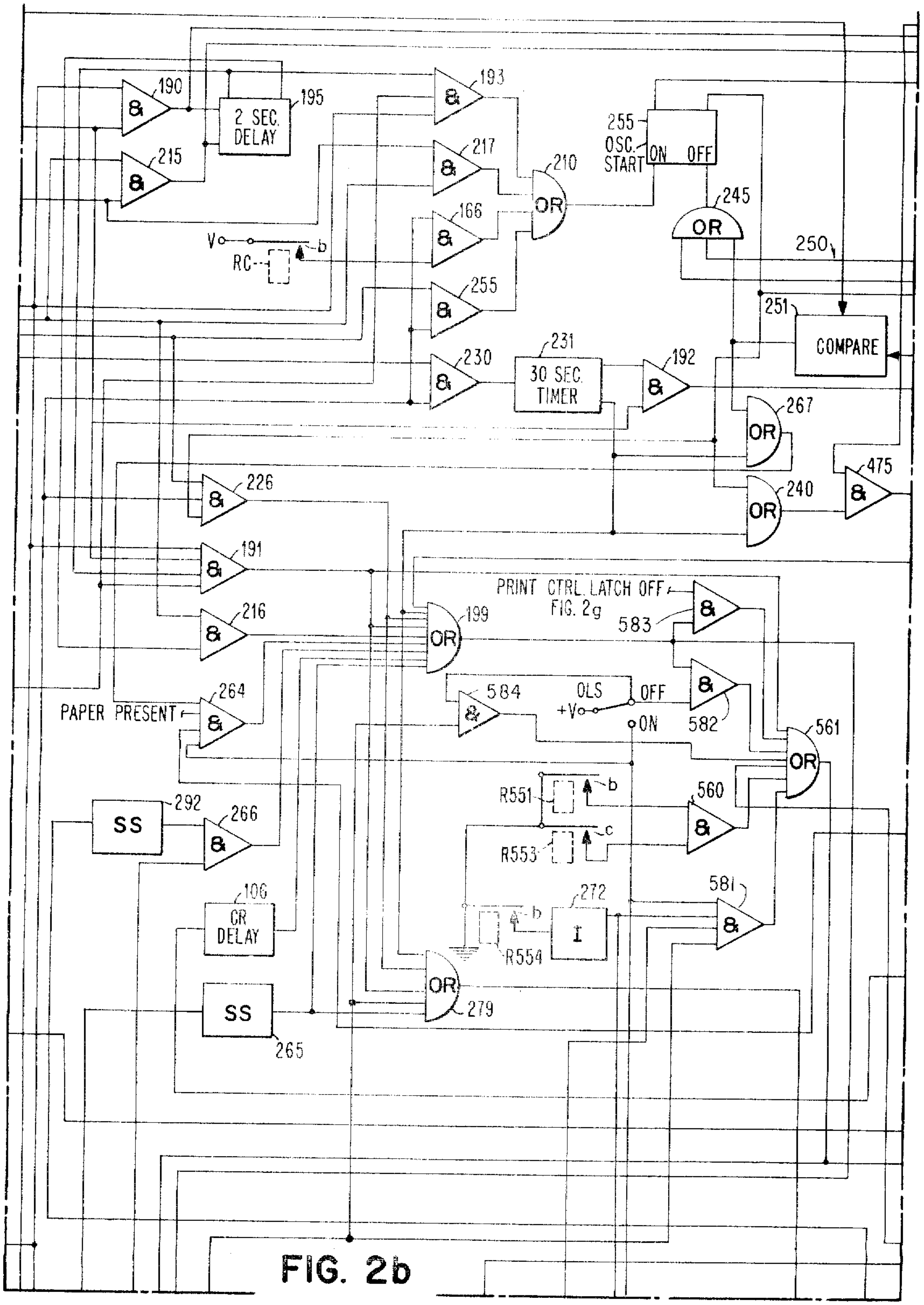
Figure 2C:
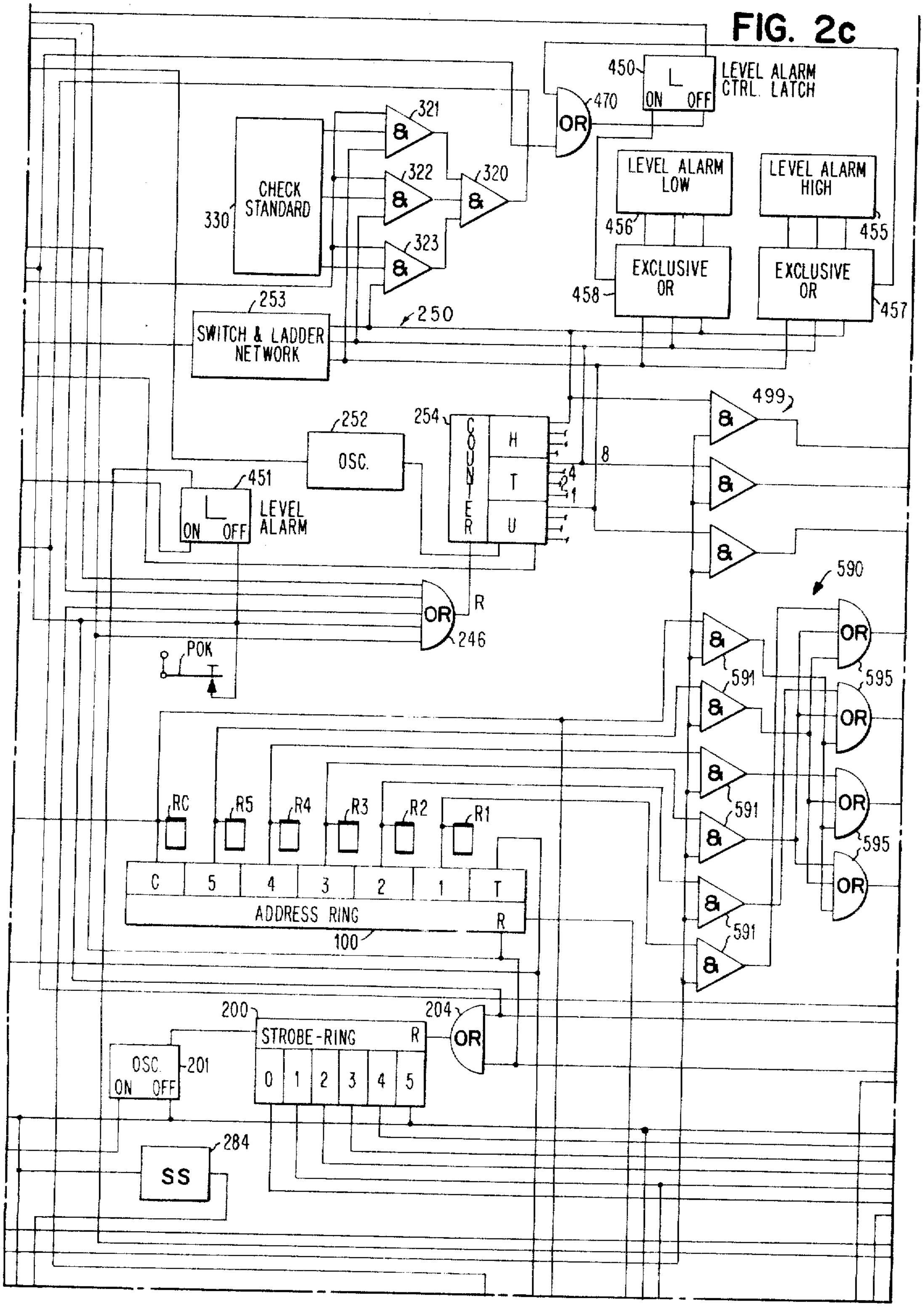
Figure 2D:
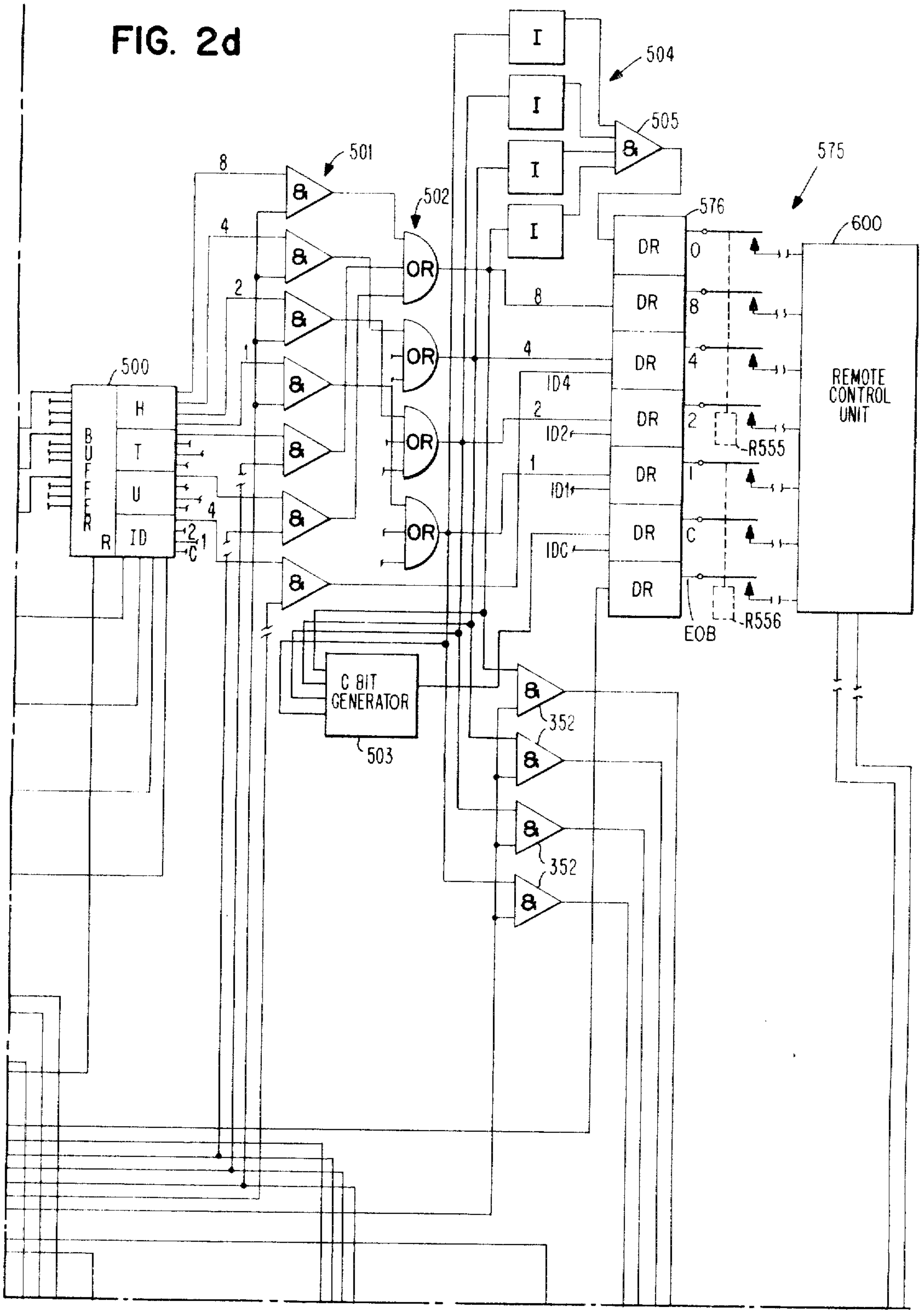
Figure 2E:
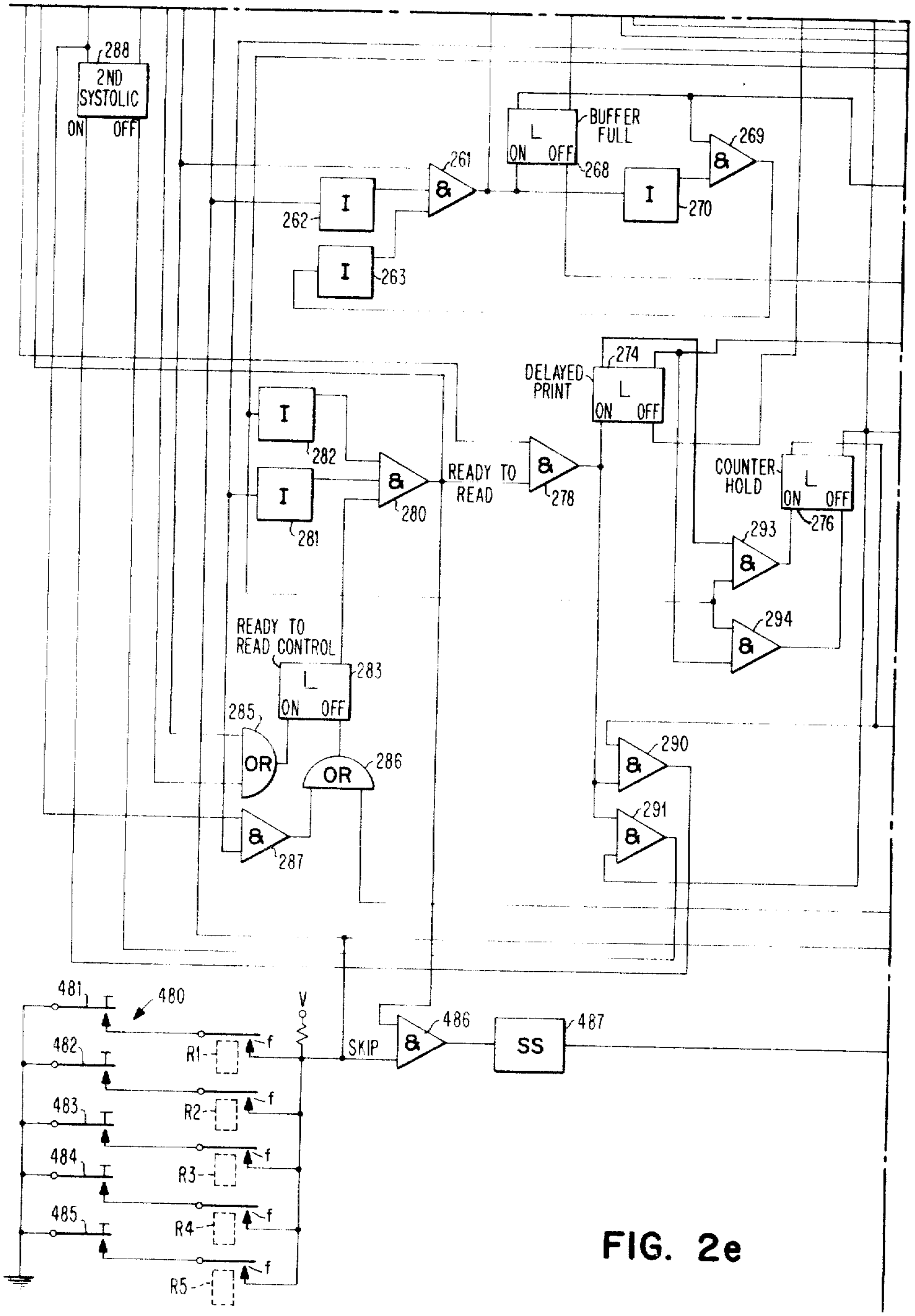
Figure 2F:
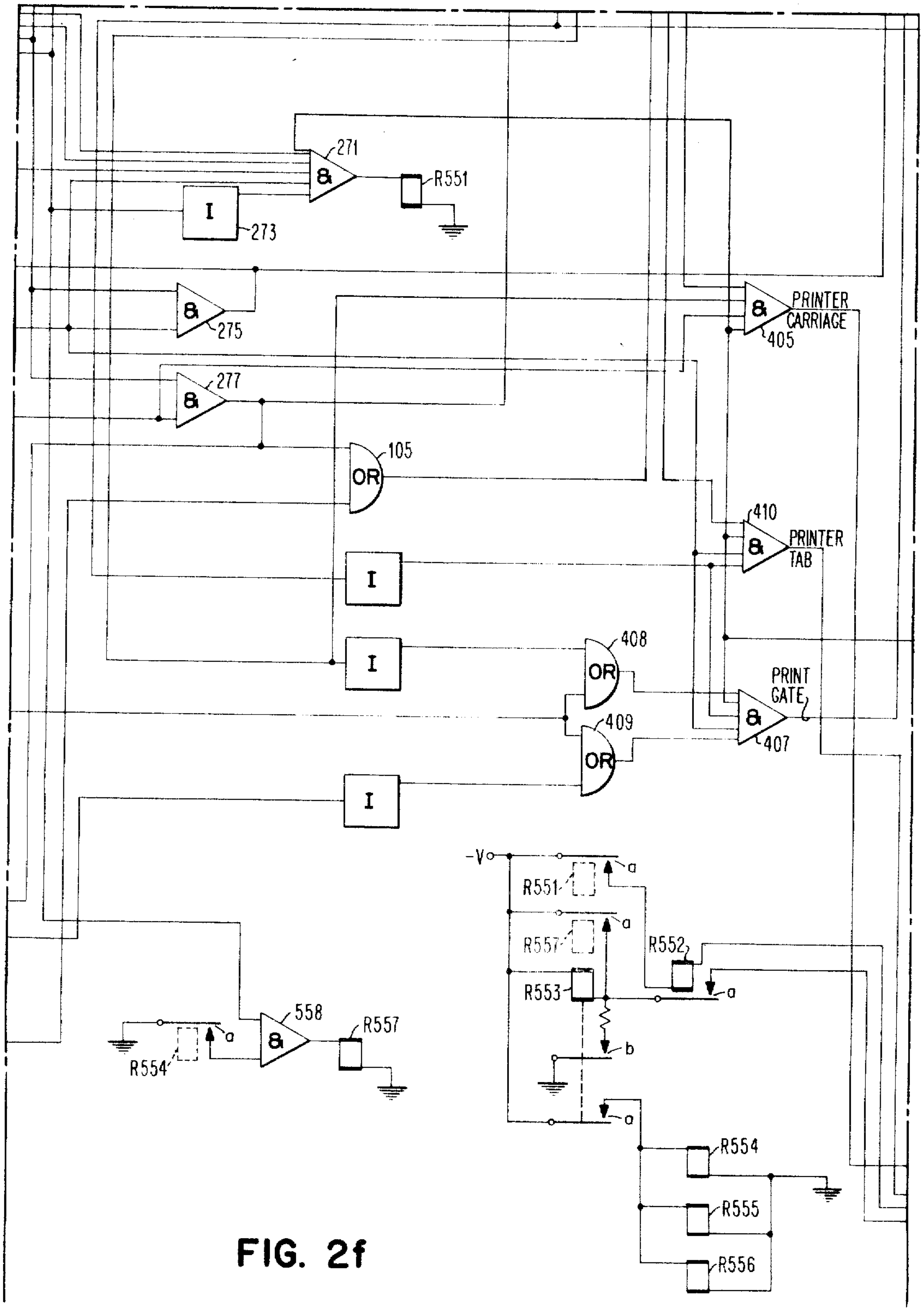
Figure 2G:
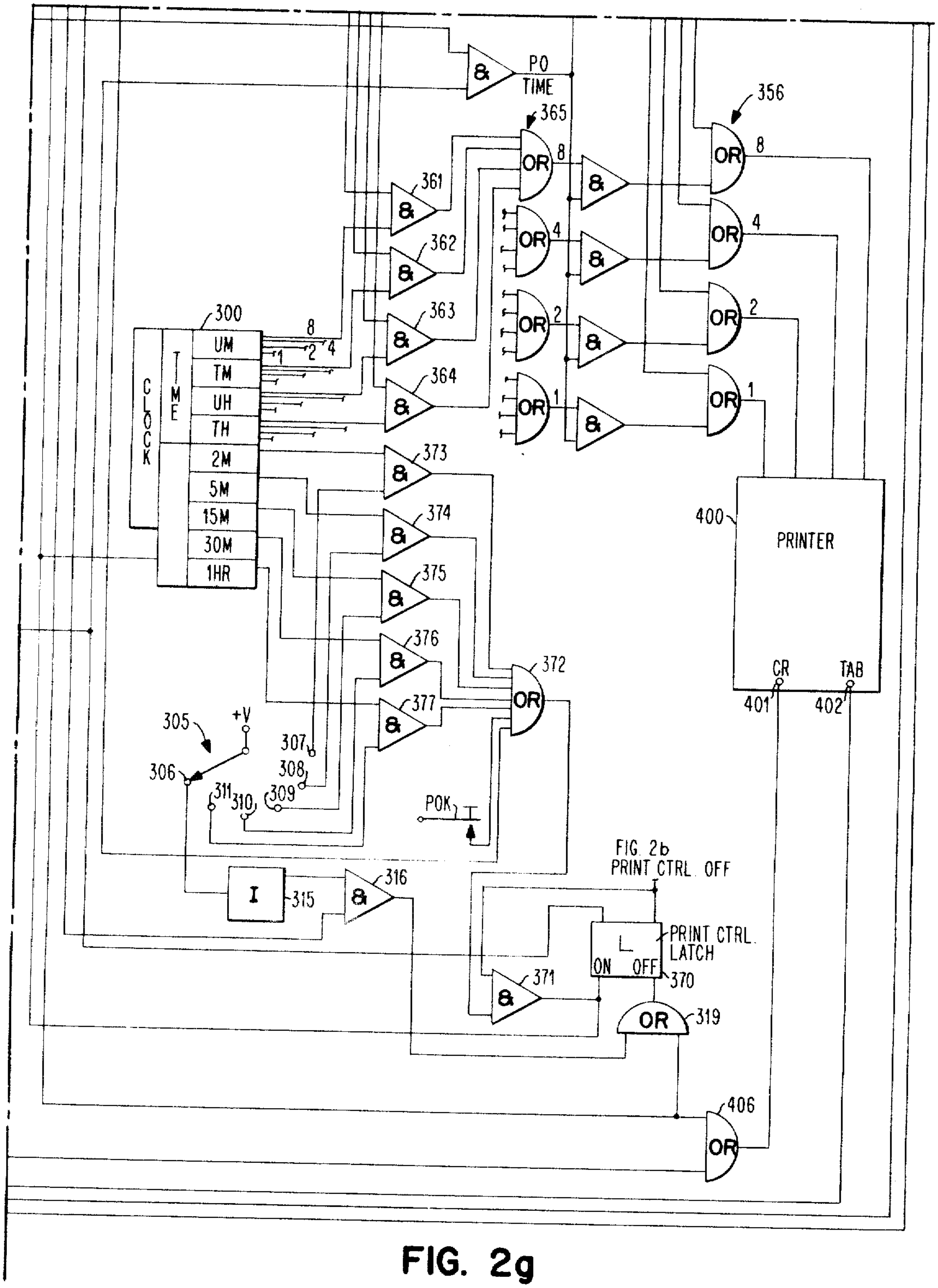
Figure 3:
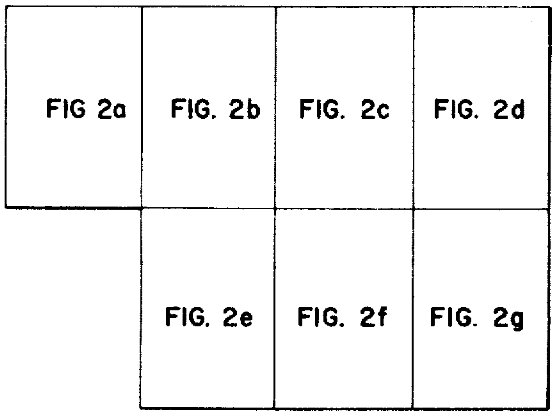
FIG. 3 is a diagram showing how FIGS. 2*a*, 2*b*, 2*c*, 2*d*, 2*e*, 2*f* and 2*g* should be taken together.

The invention is illustrated by way of example quite generally in FIG. 1. However, certain details are included so as to correspond with details of FIG. 2. The invention is shown as being embodied into an overall system for sequentially measuring, converting, accumulating, recording and transmitting physiological variables for further processing, such as by a computer. In FIG. 1, the measurement of the physiological variables is represented as data sources 10. The conversion of the measured variables takes place sequentially under control of address ring 100. The address ring 100 essentially controls scanning switches 110 for connecting the data sources to conversion unit 250. In FIG. 1, the data conversion unit 250 is shown as being separate from counter 254. However, as it will be seen shortly, the counter 254 is really part of the conversion unit 250. In this particular example, there are essentially three different kinds of conversion. The first type is an analog to digital conversion for level type variables, such as temperature, pressure, etc. The second type is a rate conversion accomplished by accumulating incremental events over a predetermined period of time which are then expressed in the appropriate units as per second, per minute, etc. Examples are pulse and respiration rates. The third type of conversion is a level conversion at predetermined periods of time. The measurement of blood pressure includes pressure measurements at the time of a first pulse for systolic blood pressure and at the time of a peak pulse for diastolic blood pressure.

The counter 254 in this example is a three digit binary decimal counter. At the end of a conversion, data transfer controls 260 are rendered operable. The data transfer controls 260 are also operably controlled by data conversion identification controls 180 according to the type of measurement and conversion which has been made. If the conversion is a rate or level conversion, one mode of operation is initiated; whereas if the conversion is for a level at a predetermined time, another mode of operation takes place.

Under the first mode of operation, the data characters in the counter 254 are transferred to a buffer storage register 500 and transmit controls 550 effect a transmission request. Upon the transmission request being honored by the polling unit, not shown, selection switches 575 are operated and strobe ring 200 is started. At zero strobe time, an identifying character derived by generator 590 which decodes the active position of address ring 100 is transmitted from the buffer 500 via the output selection switches and line drivers 575 to the transmission line. Thereafter at strobe times one, two and three, data characters in buffer 500 are sequentially transmitted and printed simultaneously. Strobe four time is reserved for printing an out-of-limits identification of a measured variable. No data is transmitted at this time. An end-of-block character EOB is transmitted at strobe five time. As a matter of interest, the printer 400 is also tabulated at this time so as to be moved into print position for the next monitored variable. Also at this time, the counter 254 and buffer 500 are reset and the address ring 100 is advanced one position.

After the fifth strobe pulse terminates, a fifth strobe delay pulse is generated. Essentially, this pulse is like a sixth strobe pulse but having a longer duration. During fifth strobe delay time, the output selection switches are opened.

If the next variable measured and converted were a level occurring at a predetermined period of time, such as systolic blood pressure, then at the end of conversion, the data transfer controls 260 are rendered operable so as not to activate the transmit controls 550 but the data in the counter 254 is transferred to the buffer 500. Additionally, under this condition, the data transfer controls 260 start the strobe ring 200 directly. No data will be transmitted as the strobe ring 200 advances through its positions because the selection switches 575 will not be closed due to no selection request having been made and honored. Further, no printing or tabulating takes place. However, the address ring 100 will be advanced to its next position at fifth strobe time and only the counter 254 will be reset due to the condition of the data transfer controls 260.

After the next measurement is converted, the data in the counter 254 is not transferred to the buffer 500 because it still contains data from the previous transfer. But the transmit controls 550 are rendered operable whereby a transmission request is made. When the request is honored by the polling unit, the selection switches 575 are closed and the strobe ring 200 is started and transmission and printing of data in the buffer 500 takes place in a manner previously indicated. At fifth strobe time, the normal counter reset is prevented by condition of the data transfer controls 260 which also prevent the address ring 100 from being advanced at this time. At fifth strobe delay time, the data transfer controls 260 are operated whereby data transfers from the counter 254 to the now empty buffer 500. Also, the transmit controls 550 are operated by the data transfer controls 260 whereby a transmission request is made. Again, when the transmission request is honored, the selection switches 575 are closed and the strobe ring 200 is operated whereby data is transmitted from the buffer 590.

A special condition exists when a systolic blood pressure measurement is followed by another such measurement. This condition is detected by a feed back from the data transfer controls 260. Essentially, the first systolic blood pressure measurement is transmitted before the second systolic blood pressure measurement and conversion is started. After the second systolic blood pressure measurement is made, it is transmitted in the usual manner.

This completes the general description. From the above it is seen that in one instance, the data transfer controls 260 render the transmit controls 550 operable and these controls in turn make a transmission request. After the transmission request is honored, the strobe ring 200 is started and data is transmitted from the buffer 500. In another instance, it is seen that the data transfer controls 260 start the strobe ring 200 directly and the transmit controls are not rendered operable at this time. The strobe ring 200 advances through its positions and the address ring 100 is advanced whereby another measurement is converted. Upon completion of this conversion, the data in the buffer 500 from the previous conversion is transmitted. Thereafter, the newly converted data transfers from the counter 254 to the buffer 500 and another transmission cycle takes place. Further, it is seen that a special condition exists for two sequential systolic blood pressure measurements.

With the foregoing in mind, a detailed description of the invention will now be given.

*Detailed description*

The data sources 10 of FIG. 1 consist of transducers 11, 12, 13 and 14 for measuring temperature, respiration rate, blood pressure and pulse rate respectively. A single transducer is normally utilized for measuring both systolic and diastolic blood pressure. Each transducer is connected to an associated signal modifier unit and there are modifiers 23 and 24 for systolic and diastolic blood pressure respectively. The signal modifier unit is essentially a pluggable electrical unit having terminals for selective connections and including electrical components for attenuating or biasing the signal from the associated transducer whereby the conversion of the measurement made will be in the correct units for the particular physiological variable. Hence, the modifiers perform a scaling function of the data input signal as well as provide signals by selective connections to enable identification of the type of physiological variable being measured.

The actual signal generation for generating signals identifying the type of measurement made, i.e., level, level at a first pulse, level at a peak pulse or rate, is performed by logic circuitry including inverters 180 and 183 and logical AND circuits 181, 182, 184 and 185. There will be an output only from one of these logical AND circuits at any one time because the transducers 11, 12, 13 and 14 and associated modifiers 21, 22, 23, 24 and 25 are scanned sequentially by means of address ring 100. The identifying terminals in the modifiers 21, 22, 23, 24 and 25 are connectable to the data identifying controls through relay contacts of relays R1, R2, R3, R4, R5 energized under control of the address ring 100.

The data signals coming from the transducers 11, 12,

13 and 14 are passed via the modifiers 21, 22, 23, 24 and 25 to either D.C. amplifier 170 or pulse amplifier 175. The amplified signals are then passed to the conversion circuitry 250. An analog to digital conversion is performed upon signals from the D.C. amplifier 170 whereas pulses from pulse amplifier 175 are accumulated under control of a timer circuit 231 for rate conversions.

Counter 254 in this example is part of the conversion apparatus 250 for the analog to digital and rate conversions. Of course, the analog to digital conversion circuitry could be of a type which would not include the counter 254. In such an instance, the converted data would be entered into the counter upon completion of the conversion. The counter could take the form of a register.

The details concerning the analog to digital conversion and the rate conversion circuitry as well as the details of the transducers, modifiers and the scanning of the modifiers via the relay contacts are described in co-pending application of Anderholm et al., Ser. No. 347,212, filed Feb. 25, 1964, for Physiological Monitoring System, and assigned to the same assignee of the present invention, and will not be repeated herein because primary emphasis will be given to the invention at hand. The important thing to note is that systolic and diastolic blood pressure are measured on the same pressure cycle. Systolic blood pressure is measured first and the diastolic measurement is made next. Also provision is had for making two successive measurements of systolic blood pressure.

The details concerning the internal time channel or clock 300, the interval timer 305, the skip control circuit 480, the calibration check circuitry 330 and the high-low limit circuit 450 are also contained in the Anderholm et al. application and will be mentioned herein only with regard to any modifications. However, with regard to the modifications, it can be summarized that time data is printed but not transmitted. Additionally, the calibration check value is transmitted but not printed. If a data input channel is skipped, no data is printed or transmitted. Out-of-limits data is transmitted in the same manner as normal data with no special designation. Data is printed and transmitted simultaneously as it is transferred from buffer.

The strobe ring 200 in this example includes a zero position. This position facilitates the transfer of the identification character from the buffer 500. The identification character is generated by the identification character generator 590 which consists of logical OR circuits 595 for converting the address ring positions to binary coded decimal characters. It should be noted that the identification characters are transmitted but not printed. The identification character is set into the buffer under control of logical AND circuits 591 which are gated or conditioned at the same time data is transferred from the counter 254 to the buffer 500. The data entered into the counter 254 during conversion of a measurement is transferred to the buffer 500 after the completion of a conversion and upon being ready to print out the data. This transfer as well as the transfer of the identification character takes place under control of logical AND circuit 261 which has inputs connected to the outputs of logical OR circuit 199 and inverters 262 and 263.

Logical OR circuit 199 functions to provide an output signal after completion of a conversion for the different types of measurements and has inputs connected to outputs of logical AND circuits 191, 216, 226, to the output of the thirty second timer circuit 231 indicating that the thirty second period has terminated, to the output of logical AND circuit 320 indicating that the calibration check was satisfactory, to the output of logical AND circuit 264 which has an output for certain check conditions, to the output of singleshot multivibrator 265 which is fired when a second systolic measurement is to be made and to the output of logical AND circuit 266 which has an output when another measurement such as the diastolic blood pressure measurement is to be transferred from the counter 254 to the buffer 500, this transfer takes place following the transmission and printing of the first systolic measurement.

Logical AND circuit 264 has an input connected to the on-line contact of manually operated switch OLS, an input connected to contact, not shown, for indicating that papers are present in the printer 400, an input connected to the check position of the address ring 100, and an input connected to the output of logical OR circuit 267 which indicates that a conversion has been completed.

Inverter 262 has its input connected to receive a skip signal. Hence, in the absence of a skip signal, logical AND circuit 261 will be conditioned. Inverter 263 functions to de-condition logical AND circuit 261 once it has passed a signal for setting buffer full latch. The buffer full latch 268 is set very quickly as logical AND circuit 261 passes a signal. However, that signal must also transfer the data from counter 254 and identification character from generator 590 into buffer 500 and this takes a longer period of time. Hence, the inverter 263 in combination with logical AND circuit 269 and inverter 270 de-conditions logical AND circuit 261. Inverter 263 has its input connected to the output of logical AND circuit 269, the same having an input connected to the set output of buffer full latch 268 and an input connected to the output of inverter 270. The inverter 270 has its input connected to the output of logical AND circuit 261.

The buffer full latch 268 functions to effect a transmission request via logical AND circuit 271 which has its output connected to energize request relay R551. Logical AND circuit 271 has an input connected to the on-line contact of switch OLS, an input connected to the ON output of buffer full latch 268, an input connected to the output of an inverter 272 for indicating that the operation is not during a select two condition, an input connected to the output of inverter 273 for indicating that the operation is not fifth strobe delay time, an input connected to the OFF side of a delay print latch 274 and an input connected to the ON side of the print control latch 370. The request relay R551 has a normally open contact **R551*a* connected in the circuit for energizing an address relay R552 which becomes energized by the polling or remote control unit 600. The address relay R552 has a normally open contact R552*a* connected in the circuit for energizing select one relay R553, which is also connected to be energized through a normally open contact, not shown, of a proceed relay in the polling unit 600. The select one relay R553 has a normally open contact R553*a* connected in the circuit for energizing parallel connected select relays R554, R555 and R556. The select one relay R553 is held through its own contact R553*b***.

With the request and select one relays R551 and R553 energized, the inputs to logical AND circuit 560 are satisfied. The output of logical AND circuit 560 is connected to an input of logical OR circuit 561 which has its output connected to the ON terminal of oscillator control latch 201. With the oscillator control latch 201 set, the strobe ring 200 is started and the data in the buffer 500 is transmitted because logical AND circuits 501 are conditioned by the pulses from the strobe ring. The data then passes via logical OR circuits 502 to the line drivers 576. The bit lines from logical OR circuits 502 are also examined by redundant bit generator 503 which provides a check bit as necessary for parity checking. Check bit generation is well known in the art. The identification character has its own check bit formed during the decoding of the ring positions. A zero bit is generated by examining the bit lines with inverters 504 which are connected to logical AND circuit 505.

As previously stated, during strobe zero time the identification character is transmitted from the buffer to the line drivers 576 which in turn put the data on the line via now closed relay contacts of the select relays R555 and R556. During strobe times one, two and three, the three data characters in the buffer 500 are sequentially transmitted onto the transmission line in the same manner as for the identification character. No data is transmitted during strobe four time. Strobe four time is used for printing an out-of-limits identification symbol if there is an out-of-limits condition for the particular measured variable. During strobe five time, an end-of-block signal (EOB) is generated via an end-of-block line driver of the line drivers 576. Additionally, the buffer 500 is reset at strobe five time under control of logical AND circuit 275 if delayed print latch 274 is OFF and the counter 254 is reset at the same time under control of logical AND circuit 277 if counter hold latch 276 is OFF. The address ring 100 is advanced also under control of the logical AND circuit 277 at strobe five time. The strobe five time position is also connected to the OFF input of the oscillator 201.

As it will be seen shortly hereinafter, by advancing the address ring 100 under control of the counter hold latch 276, this permits the strobe ring 200 to run so as to effect transmission of a systolic measurement from the buffer 500 without resetting the counter and advancing the address ring. This is because the diastolic blood pressure measurement is in the counter 254 and it is to be transferred to the buffer and then transmitted prior to a subsequent measurement being converted under control of the address ring 100.

The delayed print latch 274 is set via logical AND circuit 278 which is conditioned whenever there is a ready to read systolic condition. The ready to read condition is determined by logical AND circuit 280 which has inputs connected to the outputs of inverters 281 and 282 and an input connected to the OFF output of the ready to read control latch 283. Inverters 281 and 282 have inputs connected to the fifth position of the strobe ring and to the output of singleshot multivibrator 284 respectively. The ready to read control latch 283 has its set terminal connected to the output of logical OR circuit 285 which has inputs connected to outputs of logical OR circuits 199 and 561. The OFF input of latch 283 is connected to the output of logical OR circuit 286.

Logical OR circuit 286 has inputs connected to the output of logical AND circuit 277 and to the output of logical AND circuit 287. Logical AND circuit 287 has inputs connected to the fifth position of the strobe ring 200 and to the ON output of the second systolic latch 288. Hence, the ready to read latch 283 is reset at strobe five time if the counter hold latch 276 is OFF or if the second systolic latch 288 is ON and it is set if there is an output from either logical OR circuits 199 or 561.

The second systolic latch 288 is set and reset under control of logical AND circuits 290 and 291 respectively. Logical AND circuit 290 has one input connected to the output of logical AND circuit 278 and another to the ON output of the counter hold latch 276. Logical AND circuit 291 has one input connected to the output of logical AND circuit 278 and another input to the OFF output of counter hold latch 276. Hence, the second systolic latch 288 is set if there is a ready to read systolic signal via logical AND circuit 278 when the counter hold latch 276 is set. The counter hold latch 276 is set only if delayed print latch 274 had been set. Delayed print latch 274 is set only if there is a ready to read systolic signal. Hence, this is accomplished by a first systolic signal. The OFF output of the second systolic latch 288 is connected to the input of a logical AND circuit 266 which has its output connected to an input of logical OR circuit 199. The function of logical OR circuit 199 has been previously described.

The delayed print latch 274 is reset via logical OR circuit 279. Logical OR circuit 279 has inputs connected to outputs of the skip circuit 480 and of the logical AND circuits 191, 216 and 226 and to the timing circuit 231.

The counter hold latch 276 is set via logical AND circuit 293. The input conditions to logical AND circuit 293 are satisfied during fifth strobe delay time if the delayed print latch 274 is ON. The counter hold latch 276 is reset via logical AND circuit 294 which has an input connected to the output of singleshot multivibrator 284 for receiving a fifth strobe delay pulse and an input connected to the OFF side of the delayed print latch 274.

From the foregoing, it is thus seen that if the delayed print latch 274 is not ON, logical AND circuit 271 will be conditioned after data has been transferred from counter 254 to buffer 500 and request relay R551 becomes energized. The delayed print latch 274 will be in an OFF state if the converted measurement is something other than a systolic blood pressure measurement. With the logical AND circuit 271 conditioned, the request relay R551 becomes energized. The energization of the request relay R551 causes a transmission request to be made and upon this request being honored, address relay R552 is energized. This causes the select one relay R553 to become energized and upon it becoming energized, select relays R554, R555 and R556 become energized. It should be noted that the number of additional select relays is a function of the number of contacts per relay. A single relay could be used provided it has a sufficient number of contacts. Data is then gated from the buffer 500 under control of the strobe ring 200 which is started in response to both the request and select relays R551 and R553 being energized. After the transmission of the data, the fifth strobe delay signal conditions logical AND circuit 558 which also has an input connected to ground potential via normally open contact R554*a*. The output of logical AND circuit 558 is connected to energize drop out relay R557. With drop out relay R557 energized, normally open contact R557*a* closes and select one relay R553 is shorted, thus becoming de-energized. Consequently relays R554, R555 and R556 become de-energized and further transmission of data cannot take place until request relay R551 again becomes energized and in turn the address and select relays become energized as previously described.

If the measurement made and converted is systolic blood pressure, then the delayed print latch 274 is set via logical AND circuit 278. With the delayed print latch 274 set, the input conditions to the logical AND circuit 271 are not satisfied and the request relay R551 will not be energized. Consequently, the selection relays will also not be energized. However, the strobe ring 200 will be activated via logical OR circuit 561 because there will be an input indicating that systolic blood pressure measurement has been made. As the strobe ring 200 is advanced through its positons, no data will be transmitted or printed. This is because logical AND circuit 407 will not be conditioned since delay print latch 274 is ON and consequently no data will be gated to printer 400. Also because the select relays are not energized, no data will be transmitted to the transmission line. The address ring 100 will be advanced one position after the strobe ring has advanced through all of its positions. This enables another measurement to be converted. Normally, this subsequent measurement will be either a diastolic blood pressure measurement or a second systolic blood pressure measurement. In any event, the counter hold latch 276 will be set ON during fifth strobe delay time because the delayed print latch 274 is ON and consequently logical AND circuit 293 is conditioned.

If the subsequent measurement is a diastolic blood pressure measurement, the delayed print latch 274 will be switched OFF after the measurement and conversion has been made because there will be a signal passed by logical OR circuit 279. With the delayed print latch 274 OFF, the input conditions to logical AND circuit 271 will be satisfied and the request relay R551 will be energized. Consequently, the transmission request will be made and when the select one relay R553 is energized in the manner indicated above, the strobe ring 200 will be started. During zero strobe time, the identification character stored in buffer 500 will be transmitted. Thereafter during strobe times one, two and three, the data in buffer 500 will be transmitted and printed simultaneously because the logical AND circuit 407 is conditioned and the selection relays are energized. Hence, the previously made systolic blood pressure measurement will be transmitted and printed. The buffer 500 is reset during fifth strobe time; however, the counter 254 is not reset and the address ring 100 is not advanced because the counter hold latch 276 is ON and consequently the input conditions to logical AND circuit 277 are not satisfied. At fifth strobe delay time, the counter hold latch 276 is switched OFF via logical AND circuit 294. With the counter hold latch 276 going OFF, singleshot multivibrator 292 is fired and the signal is transferred via logical AND circuit 266, logical OR circuit 199 and logical AND circuit 261 whereby the data in the counter 254 is transferred to buffer 500 and the buffer full latch 268 is set ON. With the buffer full latch 268 ON and the delayed print latch 274 OFF, the input conditions to logical AND circuit 271 are satisfied and the request relay R551 will again be energized. This causes a transmission request and after the selection relays are energized, the strobe ring 200 is started and the diastolic measurement in buffer 500 is transmitted and printed.

Had the measurement to be made been a second systolic measurement, logical AND circuit 290 would pass a signal for setting the second systolic latch 288. Upon the second systolic latch 288 becoming set, singleshot multivibrator 265 is fired and the delayed print latch 274 is reset. This enables a transmission request to be made and the first systolic measurement is transmitted and printed in a manner as previously described. The counter hold latch 276 which had been set during the previous fifth strobe delay time will be reset during the present fifth strobe delay time and the second systolic latch 288 is switched OFF as a signal is passed via logical AND circuit 291. Logical AND circuit 291 passes a signal only after fifth strobe delay time in view of inverter 282. The singleshot multivibrator 292 is fired when the counter hold latch 276 is switched OFF; however, second systolic latch 288 is ON when counter hold latch 276 goes off. Hence, logical AND circuit 266 is not conditioned to pass the signal developed by singleshot multivibrator 292. Thereafter, the second systolic measurement is made. Then after another measurement is made, the request relay R551 becomes energized and upon energization of the select one relay R553, the strobe ring 200 is started and the second systolic measurement is transmitted and printed in the same manner as the transmission of a first systolic measurement.

Figure 4:
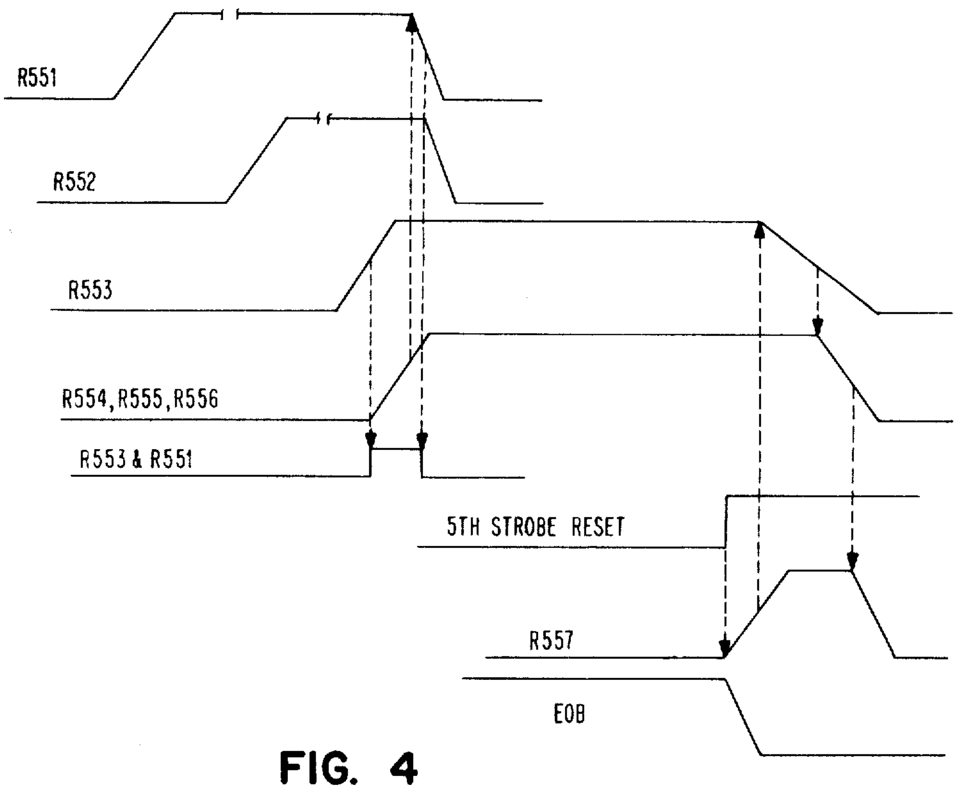
FIG. 4 is a timing diagram for the request, selection and drop-out relays.

FIG. 4 shows the timing for the energization of the request relay R551, the address relay R552 and the selection relays R553, R554, R555 and R556. From this diagram, it is seen that the request relay R551 and the select one relay R553 will be energized during the same period of time whereby the logical AND circuit 560 will be conditioned and there will be a signal for starting the strobe ring 200. The diagram also shows how the drop out relay R557 will be energized during strobe five delay time.

The timing diagram in FIG. 5 shows the various signal conditions where the first measurement converted is a level type of measurement and this is followed by a skip operation. The skip operation is followed by a systolic blood pressure measurement, the same is followed by a diastolic blood pressure measurement. The next measurement monitored is a rate measurement.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. Data transfer control apparatus comprising:
first and second data registers;

data entering means operable for entering data into said first register;
data identifying means operably connected to provide a signal in response to identifying a predetermined type of data entered into said first register;
indicating means operably controlled to provide a signal when said second register contains data;
first data transfer means connected under control of said indicating means for transferring data from said first to said second register; and
second data transferring means responsive to the simultaneous presence of a signal from said indicating means and the absence of a signal from said data identifying means for transferring data from said second register.

2. The data transfer control apparatus of claim 1 further comprising:
control means operably connected to said data identifying means and connected to said data entering means to effect entry of data into said first register upon said data identifying means identifying said predetermined data and connected to said second data transferring means to be rendered inoperable thereby.

3. The data transfer control apparatus of claim 2 further comprising:
holding means operably connected to said control means to hold data in said counter until said control means is rendered inoperable.

4. The data transfer control apparatus of claim 1 further comprising:
means connecting said data identifying means to said second data transferring means to operably control the same whereby data is transferred from said second register upon said identifying means identifying said predetermined data.

5. The data transfer control apparatus of claim 3 further comprising:
means operably connected to said holding means and connected to said first data transferring means to render the same operable upon said holding means being rendered inoperable by said control means.

6. Data transfer control apparatus comprising;
means for sequentially initiating data conversions of measured data;
a first data register;
means for entering converted data into said first register;
a second data register;
first data transfer means for transferring data from said first to said second data register;
data identifying means operably connected to provide a signal in response to identifying a predetermined type of data entered into said first register;
indicating means operably controlled to provide a signal when said second register contains data;
first and second gating means connected to control the flow of data from said second register;
first means operably controlled by said indicating means and connected to said first data gating means to render the same repetitively operable a predetermined number of times; and
second means operably controlled by said indicating means and connected to said second gating means to render the same operable for the entire time said first means is operable.

7. The data transfer control apparatus of claim 6 wherein:
said first and second means are connected to further control each other whereby said second means initiates the operation of said first means and said first means terminates the operation of said second means.

8. In a data transfer control system:
means for making sequential measurements in terms of data;

means for sequentially storing data of said sequential measurements;

means for requesting transmission of said stored data representing one of said measurements;

means for sensing time related sequential measurements;

means for withholding the transmission request for one stored measurement when a next sequential measurement is time related to said one measurement.

9. The data transfer control system of claim 8 wherein said transmission request is withheld until said second measurement is completed.

References Cited

UNITED STATES PATENTS 3,170,142 2/1965 Astrahan et al. ----- 340—172.5

ROBERT C. BAILEY, *Primary Examiner.*

G. D. SHAW, *Assistant Examiner.*